United States Patent
Glaser

(10) Patent No.: US 6,561,583 B2
(45) Date of Patent: May 13, 2003

(54) MECHANISM FOR JOINING A REMOVABLE SEAT WITH TILTING SEAT PAN TO THE FLOOR OF AN AUTOMOBILE VEHICLE

(75) Inventor: Frédéric Glaser, Sainte Helene (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 09/901,129

(22) Filed: Jul. 10, 2001

(65) Prior Publication Data

US 2002/0024228 A1 Feb. 28, 2002

(30) Foreign Application Priority Data

Jul. 10, 2000 (FR) .............................................. 00 08948

(51) Int. Cl.⁷ ................................................. B60N 2/10
(52) U.S. Cl. ........................ 297/325; 297/331; 297/334; 297/344.1; 296/65.03
(58) Field of Search .................................. 297/325, 326, 297/331, 334, 344.1; 296/65.03; 248/503.1

(56) References Cited

U.S. PATENT DOCUMENTS

| 5,282,662 A | * | 2/1994 | Bolsworth et al. ......... 296/65.1 |
| 5,498,051 A | | 3/1996 | Sponsler et al. |
| 5,626,391 A | | 5/1997 | Miller et al. |
| 5,634,686 A | * | 6/1997 | Okazaki et al. ............. 297/336 |
| 5,775,763 A | * | 7/1998 | Glinter et al. ............. 296/65.1 |
| 6,065,804 A | | 5/2000 | Tanaka et al. |
| 6,234,574 B1 | * | 5/2001 | Hoshihara et al. .......... 297/336 |

FOREIGN PATENT DOCUMENTS

| DE | 199 45 002 | 4/2000 |
| EP | 0 970 844 | 1/2000 |
| FR | 99 01104 | 8/2000 |

\* cited by examiner

*Primary Examiner*—Peter M. Cuomo
*Assistant Examiner*—Joseph Edell
(74) *Attorney, Agent, or Firm*—Connolly Bove Lodge & Hutz LLP

(57) ABSTRACT

A removable automobile vehicle seat with a tilting seat pan has at least one mechanism for connecting the front of the seat to the floor of the vehicle. The mechanism has an anchoring foot including a device for positioning the foot on an anchoring part that is joined to the floor. A lock pivots on the foot to engage with the anchoring part in a locking position such that the foot is immobilized on the floor. A lug connects a frame of the seat pan with the foot, the connecting lug being joined to the seat pan frame and mounted on the foot to pivot around a transverse axis. This allows the seat pan to pivot between a horizontal normal utilization position and a tilted forward position.

10 Claims, 4 Drawing Sheets

MECHANISM FOR JOINING A REMOVABLE SEAT WITH TILTING SEAT PAN TO THE FLOOR OF AN AUTOMOBILE VEHICLE

FIELD OF THE INVENTION

This invention concerns a removable automobile seat with a tilting seat pan. It concerns more specifically a mechanism for joining the front of such a seat to the floor of an automobile vehicle.

BACKGROUND OF THE INVENTION

Removable seats are generally designed so that they can be fixed to the floor of the vehicle in a removable manner, and therefore with the greatest possible ease of installation and removal, but also with the highest possible level of security regarding their anchoring to the floor. The means of fixing these seats to the floor must therefore be easy to use but also guarantee reliable and strong anchoring to the floor.

Moreover, a common goal is also to be able to fold these seats when not in use to increase the available floor space. It is known to this end to have folding and tilting seats, where first the seat back can be folded down onto the seat pan, and then the entire seat assembly tilted and raised forwards, in a position we will call the "stowed" position, by pivoting around a transverse axis situated towards the front of the seat pan. The seat must be able to be maintained in this raised position without any risk of falling accidentally rearwards by pivoting in the opposite direction, which is ensured in certain vehicles by an attaching system, such as elastic luggage cables (of the Sandow® type), joining the raised seat to another seat located in front of it, or to any other fixed element of the vehicle. This type of attaching system is not very satisfactory however, because it requires performing additional actions to attach the elastic cables holding the seat in the stowed position. If one forgets to attach the cable, the seat is not held in position and risks falling back inopportunely, which is detrimental to safety.

Document U.S. Pat. No. 5,626,391 shows a removable seat that can be tilted by pivoting the seat pan forward. The seat is held in the raised tilted forward position by a hinged lug which is kept under the seat pan when the seat is in the position for normal use and is unfolded to form a strut bearing on the floor to support the seat in the stowed position. This lug is deployed manually by a handle which can be either specifically for this purpose or be common to the control for releasing the rear feet of the seat and tilting the seat pan. Whatever the case, the positioning of this supporting lug requires a user action, and therefore the risk of forgetting it cannot be excluded. Furthermore, the positioning of this lug governs the locking of seat foot anchoring to the vehicle floor by means of a pivoting hook, such that the seat stays held on the floor when in the stowed position.

This locking system serves no purpose in the seat mentioned in the above document when in the normal utilization position, because the front feet are anchored by engaging a groove in the foot, that opens out towards the front of the foot, with an anchoring rod attached to the floor, with the groove extending horizontally when the seat pan itself is in the horizontal sitting position. Consequently, the lower edge of this groove forms a hook that engages beneath the said anchoring rod, with no possibility of disengaging upwards when the seat pan is in the sitting position, and is also blocked horizontally by the connection between the rear foot and the floor. The seat pan pivots around the anchoring rod, which allows the seat to be removed when the seat pan is raised, which brings the groove in the foot to a roughly vertical position thereby allowing the foot to be upwardly disengaged from the anchoring rod. The pivoting hook, which is operated at the same time as the lug for maintaining the seat in the stowed position thus serves to prevent said disengagement when the seat has to remain connected to the floor in this position.

Such a system is complex and requires numerous hinged parts, which can be sources of noise and entail high costs in parts and assembly labour, as well as increasing the weight of the seat. As a specific manoeuvre is required to maintain the seat in the raised position, it does not ensure adequate safety due to the risk of omitting to block it after tilting the seat. In addition, the system in the above mentioned document is designed for seats that tilt by pivoting of the feet with respect to the vehicle floor, and is not well suited to seats whose front feet, as it is the case with the seats targeted by the invention, are rigidly connected to the floor in the locked position, and where the seat pan pivots with respect to the said feet.

BRIEF DESCRIPTION OF THE INVENTION

The present invention aims to solve the problems mentioned above and propose a simple attaching system that ensures both reliable maintaining of the seat in the stowed position and locking of the seat-to-floor anchoring mechanism, when the seat is in the normal utilization position.

With these aims in view, the subject of the invention is a removable automobile vehicle seat with a tilting seat pan, featuring at least one device for connecting the front of the seat to the floor of vehicle, this device comprising:

- an anchoring foot comprising suitable positioning means for positioning the foot on an anchoring part that is attached to the floor, and a pivoting lock on the foot that engages in a locking position with the anchoring foot so as to immobilize the foot on the floor, and
- a lug for connecting seat pan frame to the foot, the connecting lug being joined to the seat frame and mounted to pivot on the foot around a transverse axis to allow the seat pan to pivot between a roughly horizontal position of normal use and a tilted forward position.

In accordance with the invention, the seat is characterized in that the said lug comprises:

- an arm designed to be able to bear against a stop on the pivoting lock to cause it to pivot towards the locking position when the seat pan is moved towards the normal utilization position, and block the lock in the locking position as long as the seat pan is maintained in the normal utilization position,
- a cam-shaped section that works in conjunction with a locking latch mounted on the foot, the latch featuring spring return means that cause automatic engagement of the latch with the cam when the seat pan is pivoted to the tilted forward position, to prevent pivoting of the cam in the opposite direction and maintain the seat in the tilted position.

As already understood by one skill in the art, the cam and latch system enables the seat to be automatically maintained in its stowed position when it is tilted sufficiently far forward for the latch to engage in the cam locking position, which prevents it from pivoting rearwards. The seat cannot be tilted to return the seat pan to the normal utilization position until the latch has been disengaged from the spring return mechanism, in a position allowing pivoting of the cam and hence of the seat pan. During the manoeuvre to place the seat in the stowed position, the pivoting of the seat pan is accompanied by the pivoting of the connecting lug and therefore of the cam, which firstly pushes back the latch against the spring return mechanism, then, when the contact point of the latch has passed the "summit" of the cam, lets the latch return beneath the cam to the locking position.

Moreover, when the seat is in the normal utilization position, the arm of the connecting lug prevents the pivoting lock from disengaging, thereby ensuring total protection against any risk of separation of the seat from the floor. The seat cannot be removed until the seat pan has been pivoted sufficiently far forward to disengage the lug from the stop of the pivoting lock, thereby allowing the lock to pivot, enabling the foot to be raised off the floor.

Moreover, when reinstalling the seat in the vehicle, for example, it suffices, with the seat pan tilted forward, to position the foot correctly in the corresponding anchoring part of the floor, and then tilt the seat pan rearwards, which engages the arm with the stop of the pivoting lock and, by making it pivot, brings it automatically into the locking position when the seat pan is finally in the normal utilization position. If the seat is then folded into the stowed position, the foot will remain anchored to the floor until the pivoting lock is intentionally released. There is therefore no risk of the seat becoming inopportunely and unintentionally separated from the floor, whether in the normal utilization position or in the stowed position.

In a preferential arrangement of the invention, the cam-shaped part and the arm are made up by a single part element, situated roughly in a plane perpendicular to the seat pan pivoting axis, and forming an integral part of the connecting lug. Thus, as will be more clearly understood later, it is an integral part of the lug that is shaped to constitute the arm, and whose edge constitutes the cam, with the tip of the arm that bears on the stop of the pivoting lock forming the "tip" of the said cam. A single part of the lug thus ensures the two functions of maintaining the seat pan in the tilted position and double-locking of the foot on the floor of the vehicle.

In a complementary arrangement, the lug features two of the said parts, situated symmetrically with respect to a median plan perpendicular to the pivoting axis, and in parallel near each of the sidewalls of the foot.

In other specific arrangements:

the latch is made up by a link rod mounted to pivot on the foot and of which the end distal to its pivoting axis features a finger that bears on the cam;

the finger is held against the cam by a return spring mounted on the link rod pivot spindle;

at least one end of the finger constitutes a rotation travel stop that comes to bear on the sidewalls of the foot to limit pivoting of the link rod with respect to the foot;

the finger extends laterally beyond the cam to form a pickup component for pivoting the link rod against the return effect of the spring;

the foot features towards its front a travel stop that limits forward pivoting of the lug;

the pivoting lock features a manual release handle.

the pivoting lock features two side plates interconnected by a crosspiece that constitutes the said lock travel stop.

Other characteristics and advantages will be mentioned in the subsequent description of a car rear seat in conformity with the invention.

BRIEF DESCRIPTION OF THE FIGURES

Refer to the appended drawings in which.

DETAILED DESCRIPTION OF THE INVENTION

Figure 1:
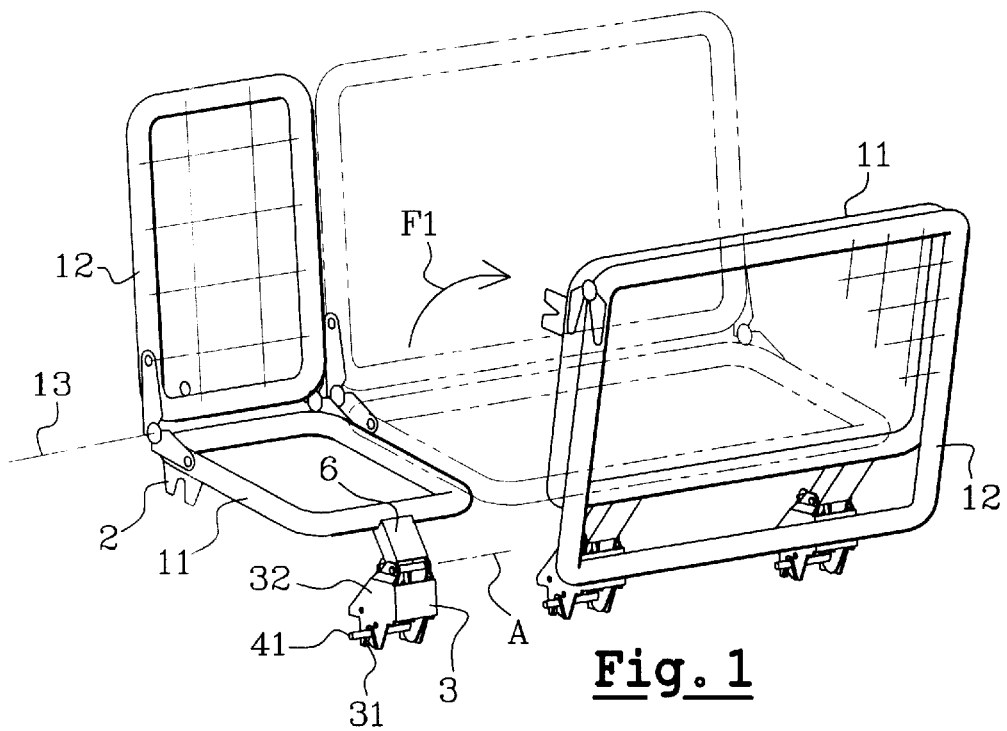
FIG. 1 is a schematic perspective view of a rear seat of an automobile vehicle.

The rear bench seat illustrated in FIG. 1 is a two-section bench of the type known as a ⅓–⅔ bench, or 40–60 bench. Each section forms an independent seat that can be folded down on itself and separated from the vehicle floor independently of the other section.

Each seat features a seat pan frame 11 and a seat back frame 12. The seat back frame 12 is mounted to pivot on the seat pan frame around a spindle 13, and can be folded down onto the seat pan. The seat pan frame 11 rests on the vehicle floor 4 and is attached to it by feet featuring means of anchoring to the said floor. Each seat features rear feet 2 and one or two front feet 3.

Each front foot 3 features means for positioning it with respect to the floor, comprising in the illustrated example an inverted V cutaway 31 made in the lower part 33 of a vertical wall 32 of the foot, the cutaway 31 engaging on an anchoring part, in this case comprising a horizontal rod 41 placed in a recess 42 in the floor 4. The lower part 33 of the foot featuring the V-shaped cutaway, fits into the recess 42 such that the foot rests on both rod 41 which centres it, and on the edges of the recess, as can be seen clearly in FIGS. 4 to 7. A pivoting lock 5 is mounted on the foot such that it can engage under the rod by pivoting and rigidly connect the foot to the floor. The rear feet can be connected to the floor by similar means. Systems for attaching removable seats to the floor of a vehicle, comprising the elements described above are already well known and besides must not be considered as limiting to the present invention.

The seat pan frame 11 is connected to the front foot 3 by a connecting lug 6 attached to the frame, for example by being welded directly to the tube forming the said frame. The connecting lug 6 is moreover hinged on the foot 3 around a transverse axis A by means of a trunnion 61 attached to two upper lugs 34 of the foot.

Thus, as can be seen in FIG. 1 for the wider part of the bench seat, after releasing the rear feet, the seat back can be folded down on the seat pan by pivoting around spindle 13, then the entire seat tilted forward by pivoting around axis A in the direction of arrow F1, to bring the seat into the stowed position.

Figure 3:
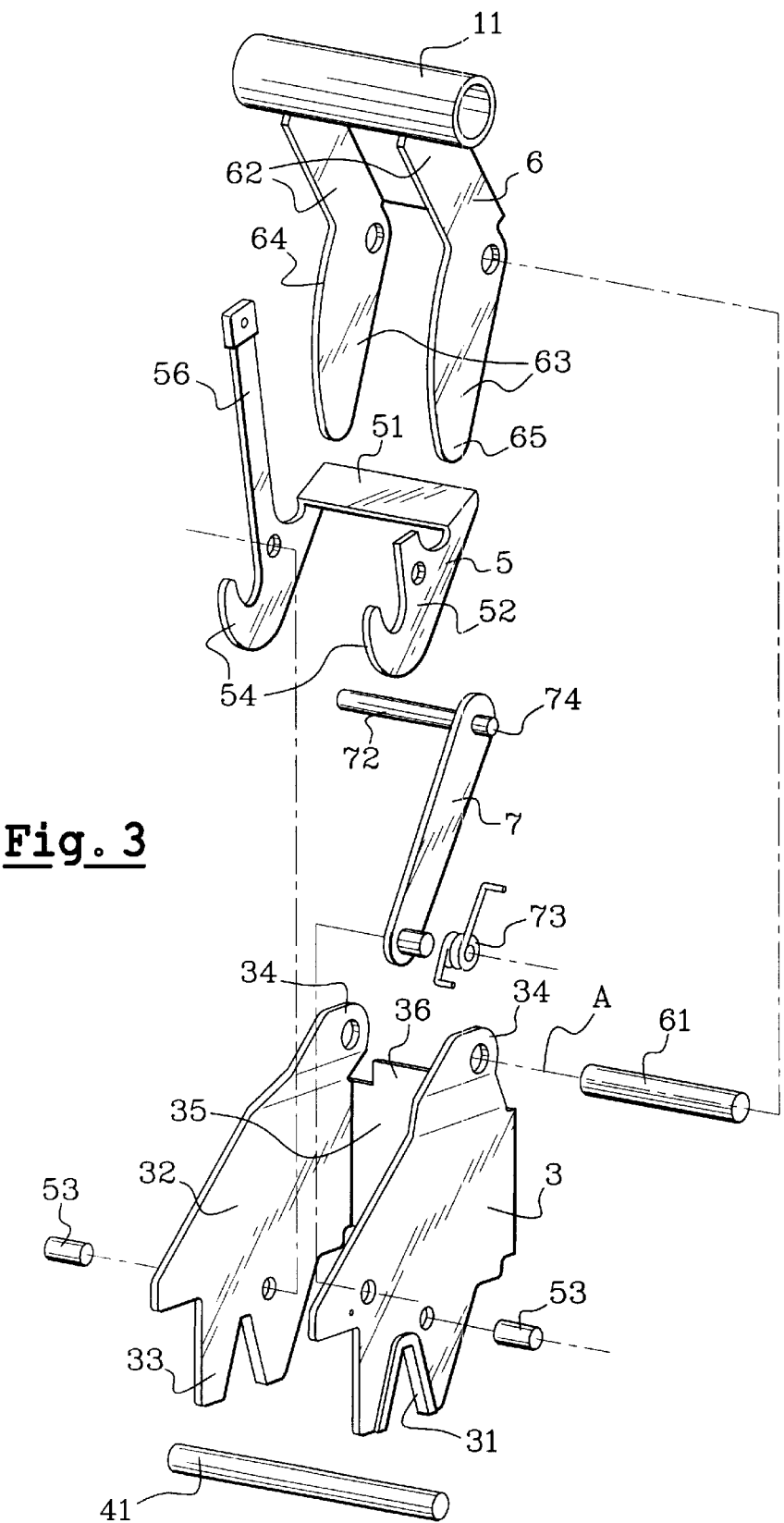
FIG. 3 is an exploded view of this same mechanism, illustrating the different constituent parts.
Figure 6:
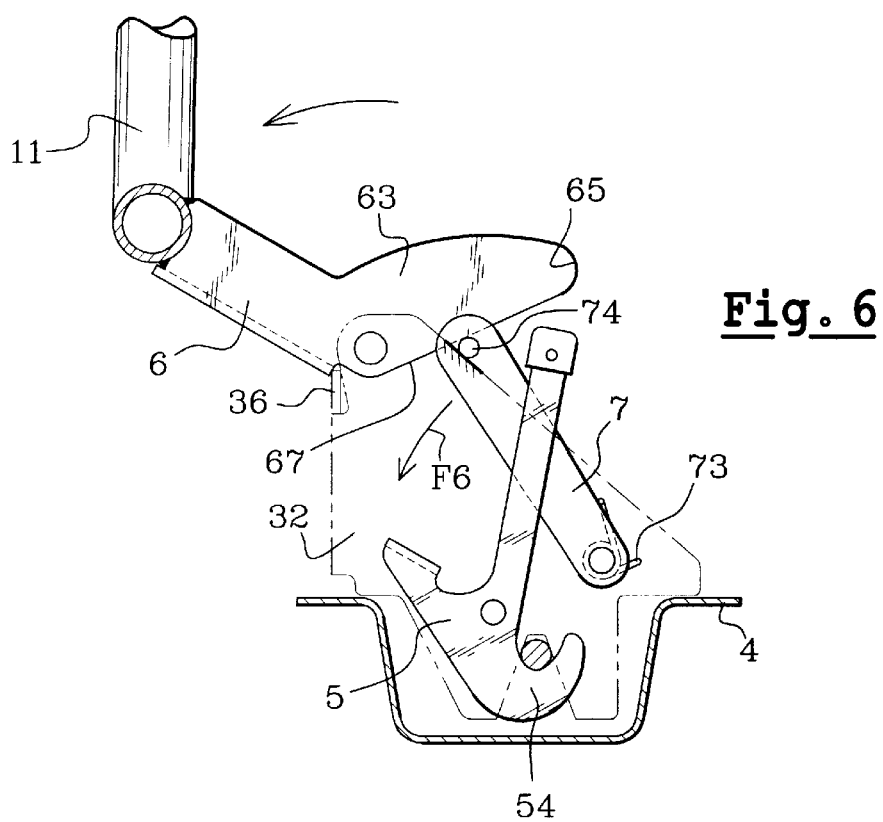
Figure 7:
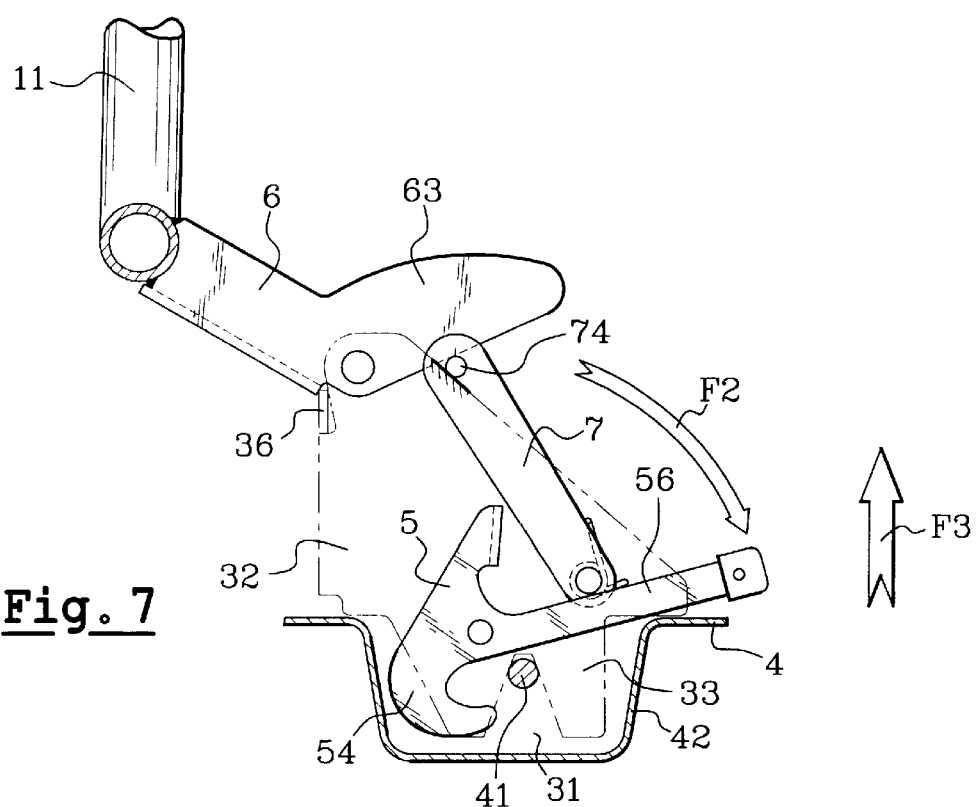

As can be seen clearly in FIG. 3, the foot is made from a metal sheet folded into a U shape whose flanges constitute the sidewalls 32 of the foot and the bottom forms a front face 35 featuring in its upper section an upward extension 36, that acts as a stop for lug 6 when the seat pan is tilted forwards, as shown in FIGS. 6 and 7.

Lug 6 is also made from a metal sheet folded into a U shape and whose flanges 62 are situated between the lugs 34 of the foot and are crossed by hinging trunnion 61, the ends of which are joined, by crimping for example, to the said lugs 34.

Figure 2:
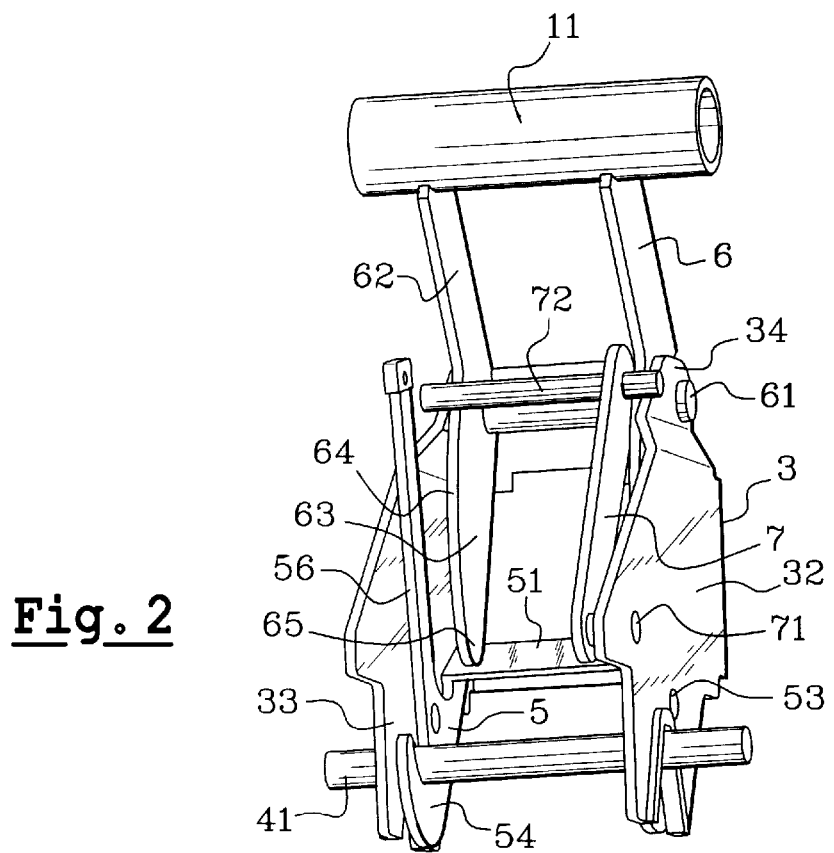
FIG. 2 is a perspective view of the mechanism for connecting a seat to the vehicle floor, in a position where the seat is locked to the floor and the seat pan is roughly horizontal, when in the normal utilization position.
Figure 4:
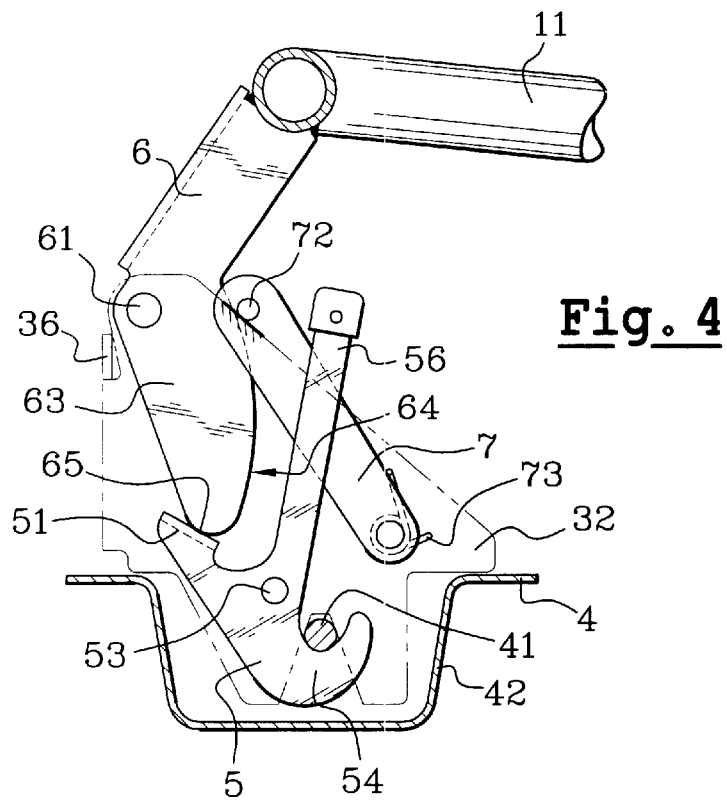
FIGS. 4 to 7 illustrate the operation of the mechanism, in four successive phases of pivoting of the seat pan and preparation for removal of the seat.
Figure 5:
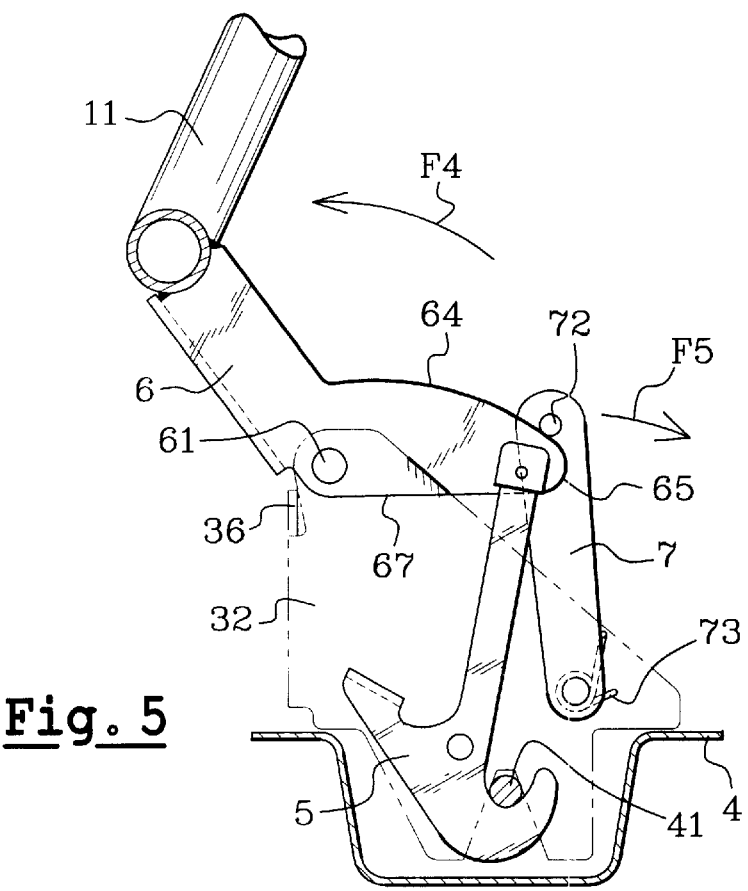

Each flange 62 is extended beyond the pivoting axis A by an arm 63, of which the upper edge 64 has a cam-shaped profile. The length of arm 63 and the shape of the cam are determined such that when the seat pan is in the normal utilization position, as shown in FIGS. 2 and 4, the tip 65 of the arm, which also forms the "tip" of the cam, bears against a stop plate 51 of the pivoting lock.

The pivoting lock 5 features two side panels 52, situated respectively between and against the two sidewalls 32 of the foot and linked by the said stop plate 51. Each panel of the pivoting lock is hinged on the adjacent sidewall of the foot by a trunnion 53, and features, roughly opposite with respect to the stop plate 51 and with respect to trunnion axis, a hook 54 configured such that it engages under anchoring rod 41 in the locking position. Furthermore, the pivoting lock 5 features a handle 56 extending from one of the panels to allow manual pivoting of the lock.

The geometry of the pivoting lock, the position of its pivot axis and the shape of the hook 54 are determined such that, from a position in which the lock is not engaged with the anchoring rod 41, as shown by the example in FIG. 7, pivoting of arm 63 of the connecting lug 6 brings the tip 65 of the arm into contact with the stop plate 51, then makes lock 5 pivot until hook 54 engages under the anchoring rod 41. Hook 54 moreover has a geometry such that when in the locked position illustrated in FIGS. 4 to 6, it can not pivot if a lifting force is applied to the seat and therefore transmitted to the foot. Only a pivoting torque applied using handle 56 in the direction of arrow F2 can disengage the hook so that the seat can be removed from the vehicle by lifting it in the direction of arrow F3.

To maintain the seat in the tilted forward position, the foot features a latch made up in the illustrated example of a link rod 7 hinged at one end on a sidewall 32 of the foot by means of a trunnion 71. The other end of the link rod bears a finger 72 that extends roughly parallel to axis A to come into contact with the cam-shaped edges 64, 67 of arms 63. A spring 73 is mounted on the hinging trunnion 71 to apply a return spring torque on the link rod, applying the finger against the cam as shown in FIGS. 2 and 4. When the seat pan 11 is tilted forward in the direction of arrow F4, the cam 64 pushes back the finger, in the direction of arrow F5 (FIG. 5), then, as soon as the tip 65 of the arm passes beyond the finger and the finger 72 can pass under arm 63, the spring 73 returns the link rod 7 to its initial position, in the direction of arrow F6 in FIG. 6, until the tips 74 of the finger abut against the upper edge of sidewalls 32 of the foot, with the lower edge 67 of arms 63 being above the finger 72. Returning of the arm and lug in the opposite direction is then prevented by the finger which forms a stop under the arm 63. Lug 6 is then held between the front stop 36 of the foot on the one hand and finger 72 on the other, as indicated above, and the seat is held in the stowed position, as shown in FIG. 6, with no risk of fall rearwards. To return it to the normal utilization position, the arm must be disengaged manually by pulling on finger 72 against spring 73, in the direction of arrow F5.

It will be further noted that the lugs 34 are offset towards the interior of the foot with respect to the sidewalls 32, such that the width of lug 6 is narrower than the distance between the two sidewalls 32. This enables the link rod 7 on the one hand and the handle 56 on the other hand to be placed against the said sidewalls 32 without interfering with the arms 63 when they move.

The invention is not limited to the embodiment described above merely by way of example. More specifically, the system for positioning the seat with respect to the floor and for making the pivoting lock could be modified without going outside the framework of the present invention, and other systems can be used on condition that the arm, cam and stop mechanism in accordance with the invention, can be applied to it. Equally, the connecting lug could feature a single arm bearing the cam, or the arm and cam could be made on different sections of the lug, on either side of it for example.

What is claimed is:

1. Removable automobile vehicle seat with a tilting seat pan having at least one mechanism for connecting the front of the seat to the floor of the vehicle, the mechanism comprising:

an anchoring foot including means for positioning the foot on an anchoring part that is joined to the floor; and a lock that pivots on the foot to engage with the anchoring part in a locking position such that the foot is immobilized on the floor;

a lug connecting a frame of the seat pan with the foot, the connecting lug being joined to the seat pan frame and mounted on the foot to pivot around a transverse axis, to allow the seat pan to pivot between a horizontal normal utilization position and a tilted forward position, the lug having:

a) an arm bearing on a lock stop of the pivoting lock to cause the lock to pivot towards the locking position when the seat pan is moved to a normal utilization position, and to block the lock in the locking position as long as the seat pan is kept in the normal utilization position, and b) a cam cooperating with a locking latch mounted on the foot, the latch having a spring return means for automatically engaging the latch with the cam when the seat pan is tilted forward, to prevent pivoting of the cam in an opposite backward direction and to maintain the seat in the tilted forward position.

2. Seat in accordance with claim 1, wherein the foot includes, towards its front, a stop limiting forward pivoting of the lug.

3. Seat in accordance with claim 1, wherein the pivoting lock includes a manual release handle.

4. Seat in accordance with claim 1, wherein the pivoting lock includes two side plates linked by a crosspiece forming the said lock stop.

5. Seat in accordance with claim 1, wherein the cam and the arm form a single member.

6. Seat in accordance with claim 5, wherein the lug includes two of the single members.

7. Removable automobile vehicle seat with a tilting seat pan having at least one mechanism for connecting the front of the seat to the floor of the vehicle, the mechanism comprising:

an anchoring foot including means for positioning the foot on an anchoring part that is joined to the floor; and a lock that pivots on the foot to engage with the anchoring part in a locking position such that the foot is immobilized on the floor;

a lug connecting a frame of the seat pan with the foot, the connecting lug being joined to the seat pan frame and mounted on the foot to pivot around a transverse axis, to allow the seat pan to pivot between a horizontal normal utilization position and a tilted forward position, the lug having:

a) an arm bearing on a lock stop of the pivoting lock to cause the lock to pivot towards the locking position when the seat pan is moved to a normal utilization position, and to block the lock in the locking position as long as the seat pan is kept in the normal utilization position, b) a cam cooperating with a locking latch mounted on the foot, the latch having a spring return means for automatically engaging the latch with the cam when the seat pan is tilted forward, to prevent pivoting of the cam in an opposite backward direction and to maintain the seat in the tilted forward position, and wherein the latch includes a link rod pivot-mounted on a pivot spindle located on the foot and of which the distal end of the link rod has a finger that bears on the cam.

8. Seat in accordance with claim 7, wherein the finger is kept in contact with the cam by a return spring mounted on the pivot spindle of the link rod.

9. Seat in accordance with claim 7, wherein at least one end of the finger constitutes a rotation travel stop that abuts against sidewalls of the foot to limit pivoting of the link rod with respect to the foot.

10. Seat in accordance with claim 7, wherein the finger extends laterally beyond the cam to form a pickup component to make the link rod pivot against the force of the return spring.

* * * * *